(12) United States Patent
Sasaki et al.

(10) Patent No.: US 6,714,363 B2
(45) Date of Patent: Mar. 30, 2004

(54) OPTICAL LENS DEVICE ASSEMBLY

(75) Inventors: Hironori Sasaki, Yamanashi (JP);
Masahiro Uekawa, Kanagawa (JP);
Takeshi Takamori, Tokyo (JP);
Yoshinori Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/133,318

(22) Filed: Apr. 29, 2002

(65) Prior Publication Data
US 2002/0171923 A1 Nov. 21, 2002

(30) Foreign Application Priority Data
May 15, 2001 (JP) ........................................ 2001-144835

(51) Int. Cl.[7] ................................................. G02B 6/42
(52) U.S. Cl. .......................... 359/793; 385/33; 385/91; 385/93
(58) Field of Search ................. 359/793, 362; 385/31, 33–35, 38, 49, 88, 90–93, 51, 94

(56) References Cited

U.S. PATENT DOCUMENTS

| 4,726,645 A | * | 2/1988 | Yamashita et al. | ............. 385/35 |
| 5,175,783 A | * | 12/1992 | Tatoh | ........................... 385/93 |
| 5,349,472 A | * | 9/1994 | Terai et al. | .................. 359/649 |
| 5,513,289 A | * | 4/1996 | Hosokawa et al. | ............ 385/33 |
| 5,778,127 A | * | 7/1998 | Gilliland et al. | ............... 385/92 |
| 5,911,021 A | | 6/1999 | MacDonald et al. | |
| 6,483,969 B1 | * | 11/2002 | Yap et al. | ....................... 385/52 |
| 2001/0024553 A1 | * | 9/2001 | Nakanishi et al. | ............. 385/94 |

* cited by examiner

Primary Examiner—Scott J. Sugarman
Assistant Examiner—Deborah A. Raizen
(74) Attorney, Agent, or Firm—Wenderoth, Lind & Ponack, L.L.P.

(57) ABSTRACT

An optical lens device assembly containing an optical lens device and an optical device sealed without causing complication of optical module configurations is provided. In the optical lens device assembly, a resin member having light transmittance is used to fill in space between the optical lens device and the optical device to be optically coupled to the optical lens device. The resin member is made from a resin material having a refractive index being different from that of the optical lens device. The resin member is used to seal a clearance between optical planes, which face each other, of the optical lens device and the optical device, and to mechanically couple the optical lens device to the optical device.

12 Claims, 1 Drawing Sheet

OPTICAL LENS DEVICE ASSEMBLY

BACKGROUND OF THE INVENTION

1. Field of the Invention

The present invention relates to an optical lens device assembly which is sealed with a resin and is suitably used for an optical module for communications and more particularly to the optical lens device assembly being suitably used in an assembly made up of microlenses.

2. Description of the Related Art

In an optical module for communications, it is desirable that an optical device making up the optical module is held in a sealed state in order to protect it from the influence of dust or humidity. Therefore, conventionally, a clearance between a laser diode being used as a light emitting element and an optical fiber used as an optical waveguide which receives signal light emitted from the laser diode is sealed with a resin material. In this case, the resin material placed between the optical waveguide and light emitting element has a refractive index the same as that of the optical waveguide, and therefore the optical waveguide can be extended in a pseudo manner so as to reach the light emitting element. As a result, without causing a drop in coupling efficiency between the optical waveguide and light emitting element, the clearance between them can be substantially sealed.

On the other hand, in a module in which an optical device is embedded, the optical lens device does not properly work as originally designed depending on the refractive index of the resin material to be applied. Since the lens design strongly depends on the indices of refraction of the lens material and the surrounding resin, therefore, sealing using such the resin material is not employed. A method is being used in which an optical device is to be optically coupled to the optical lens device is housed in a housing for sealing having a window for optical coupling for the optical lens device.

However, when a sealing mechanism using the conventional housing for sealing as described above is used, configurations of the module and its manufacturing processes are made complicated, thus causing an increase in costs.

SUMMARY OF THE INVENTION

In view of the above, it is an object of the present invention to provide an optical lens device assembly containing an optical lens device which can be sealed without causing complication of optical module configurations.

According to a first aspect of the present invention, there is provided an optical lens device assembly including an optical lens device serving as a first optical device, a second optical device to be optically coupled to the optical lens device and a resin member having optical transmittance used to fill in space between the first optical device and the second optical device. The resin member is made up of a resin material having a refractive index different from that of the optical lens device and is used to seal a clearance between optical planes, which face each other, of the both optical devices and to mechanically couple the optical lens device to the second optical device.

In the foregoing, a preferable mode is one wherein the first optical device is a microlens.

Also, a preferable mode is one wherein the both optical devices are microlenses.

Also, a preferable mode is one wherein the first optical device is a microlens in which a lens plane is formed on at least one end face of an optical substrate made up of a silicon crystal.

Also, a preferable mode is one wherein the first optical device is made up of silicon crystal and the resin member is made up of silicone resin.

Furthermore, a preferable mode is one wherein the first optical device is designed so that its optical characteristics are acquired based on a refractive index of the resin material.

With the above configurations, by the resin member placed between the optical lens device and the second optical device being optically coupled to the optical lens device, without loss of optical functions of the optical lens device, the clearance between them can be sealed, and therefore a factor of interference, such as a temperature, humidity, dust or a the like, can be removed. Moreover, without use of any other special fixing unit, reliable positioning of the optical lens device and the second optical device is achieved, and therefore a deviation in coupling positions caused by vibration in use or other interference factors does not easily occur and the durability of the optical lens device assembly against the interference factors such as the vibration can be improved accordingly.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Figure 1:
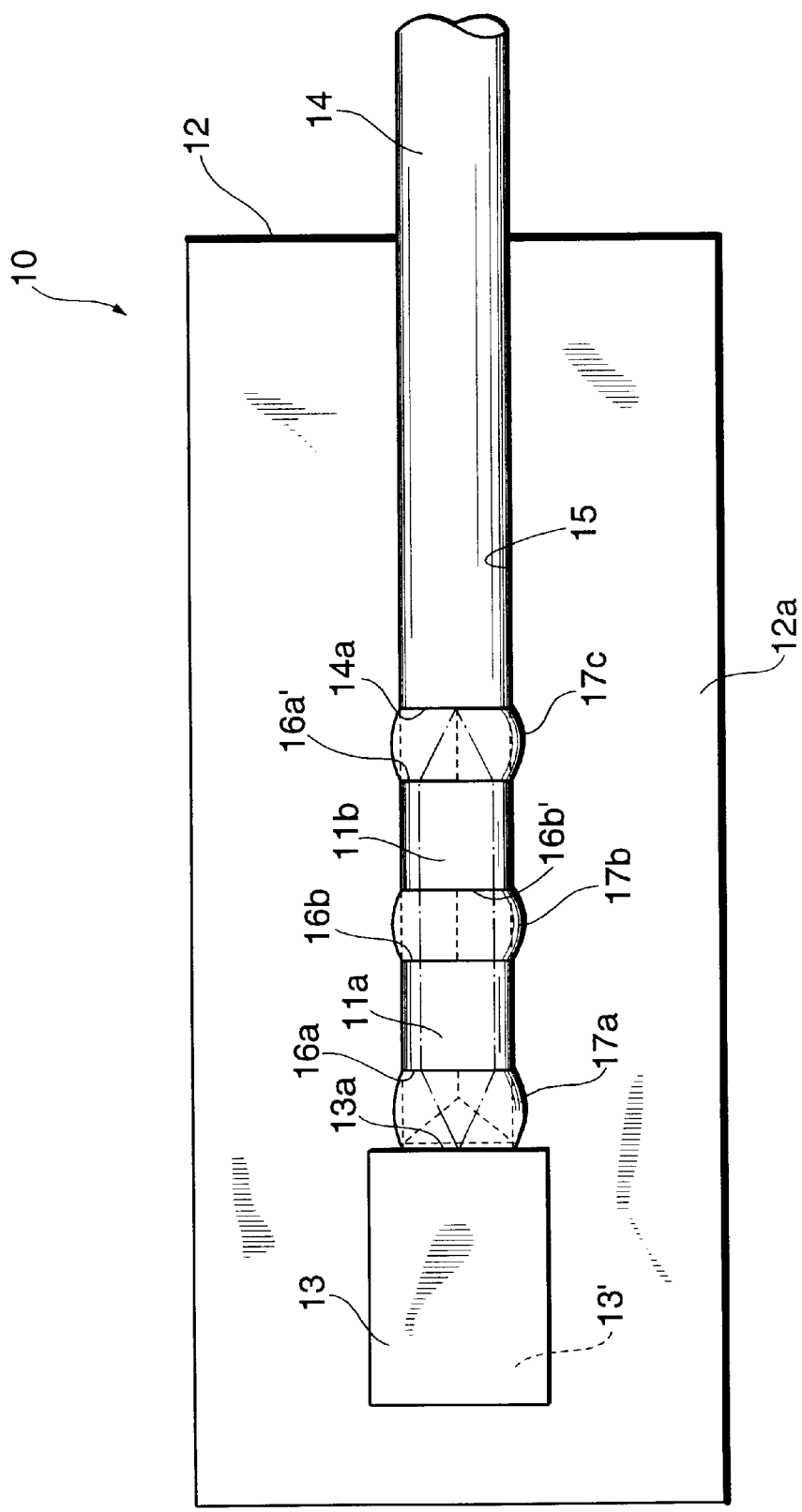
FIG. 1 is a plan view of an optical lens device assembly according to an embodiment of the present invention.

Best modes of carrying out the present invention will be described in further detail using various embodiments with reference to the accompanying drawings.

Embodiment

FIG. 1 is an example of an application in which an optical lens device assembly 10 of an embodiment of the present invention is used and the lens device is a microlens. The optical lens device assembly 10 shown in FIG. 1 comprises two microlenses 11a and 11b. The microlenses 11a and 11b are used as an optical lens device and serve as the optical lens device assembly 10 to guide signal light emitted from a light-emitting end face 13a of a laser diode 13 (a light emitting element) to an end face 14a of an optical fiber 14 (serving as an optical waveguide) on, for example, a crystal substrate 12 used as a support substrate.

As the crystal substrate 12, for example, a silicon crystal substrate is employed. On the crystal substrate 12 is formed, by an etching method, a V-shaped concave groove 15 used to position the optical fiber 14. The optical fiber 14 is fitly supported on the crystal substrate 12 by partial insertion of its surrounding portion into the concave groove 15. Moreover, the laser diode 13 is fixed in the vicinity of a terminating portion of the concave groove 15 on a surface of the crystal substrate 12 through a well-known electrode 13' placed, by passive alignment technology, so that an optical axis of a light emitting end face 13a of the laser diode 13 is aligned exactly with an optical axis of the optical fiber 14 positioned by the concave groove 15.

The optical fiber 14 receives a 1.3 $\mu$m or 1.55 $\mu$m wavelength optical signal emitted from the laser diode 13, and operates to guide the received signal light to a required destination. Moreover, the optical fiber 14 can be constructed of a single mode optical fiber having an outer diameter of, for example, 125 $\mu$m.

The microlenses 11a and 11b are placed between the laser diode 13 and optical fiber 14 so as to guide the signal light emitted from the light emitting end face 13a of the laser diode 13 to the end face 14a of the optical fiber 14.

Each of the microlenses 11a and 11b comprises an optical element having a cylindrical shape as a whole which has an outer diameter almost the same as that of the optical fiber 14. Both the microlenses are placed between the laser diode 13 and the optical fiber 14 in the concave groove 15 in a manner so that a space is left between the laser diode 13 and the microlens 11a and between the microlens 11b and the optical fiber 14, while a space is also left between the microlenses 11a and 11b. As a material for each of the microlenses 11a and 11b, an optical material being suitable for the wavelength of light to be handled can be selected. For example, if light having a wavelength of 1.3 µm or 1.55 µm is handled, a low-loss material in the wavelength of 1.3 µm or 1.55 µm such as a silica or silicon can be employed.

In the example shown in FIG. 1, an end face 16a, which faces the laser diode 13, of the microlens 11a placed in the vicinity of the laser diode 13 is used as a lens plane. The lens plane has a collimating function to convert diverging light emitted from a light-emitting face 13a of the laser diode to a collimated beam. The other end face 16b of the microlens 11a is a flat plane implementing no lens function. Each of the microlenses 11a and 11b may be provided, if necessary, with desired lens functions other than the collimating function.

The microlens 11b placed in the vicinity of the optical fiber 14 has a lens plane at its one end face 16a' which faces the optical fiber 14, and the lens plane has a light-gathering function to gather the collimated beam transferred from the microlens 11a at an end face 14a of the optical fiber 14. Another end face 16b' of the microlens 11b is a flat plane implementing no lens function for the light.

As each of lens planes 16a and 16a' of the microlenses 11a and 11b, either of a well-known diffractive optical element (diffractive lens) using a diffraction phenomenon or a refractive optical lens using a refraction phenomenon may be employed as necessary. For example, a computer-generated hologram (CGH) can be used as the diffractive optical element.

Moreover, if necessary, an antireflection coating may be formed at both end faces 16a and 16a' and at both end faces 16b and 16b' of the microlenses 11a and 11b.

Both the microlenses 11a and 11b are arranged serially in the concave groove 15 in a manner that the flat end faces 16b and 16b', used as a non-lens planes, face each other with a space being left between the end faces 16b and 16b'.

Since an outer diameter of each of the microlenses 11a and 11b making up the optical lens assembly 10 is equal to that of the optical fiber 14, by placing surrounding side portions existing between both end faces 16a and 16b and between both end faces 16a' and 16b' in the concave groove 15 of the crystal substrate 12 defining a reference plane as shown in FIG. 1, the microlenses 11a and 11b can be placed in a manner that optical axis of the optical lens assembly 10 coincides with that of a reference optical axis defined by the laser diode 13 and the optical fiber 14.

The microlenses 11a and 11b are placed, as described above, in a manner that space is left between the microlenses 11a and 11b, between the microlens 11a and the light emitting element 13 and between the microlens 11b and the optical fiber 14. To fill in the space, a resin member 17 (17a, 17b and 17c) made from a resin material and having light transmittance for the signal light is provided.

If the microlenses 11a and 11b are made of a silicon crystal substrate having a refractive index of approximately 3.5, a silicone resin having a refractive index of 1.5 is used as the resin member 17 (17a, 17b and 17c).

The resin member 17a placed between the laser diode 13 and the microlens 11a serves to fill in the space between the light-emitting face 13a of the laser diode 13 and the lens plane 16a of the microlens 16a and to receive signal light from the light-emitting face 13a and, at the same time, serves as an adhesive between them.

Therefore, the clearance between the laser diode 13 and the microlens 11a is sealed with the resin member 17a. The sealed clearance portion is protected from dust, humidity or the like, and the light-emitting face 13a of the laser diode 13 is mechanically adhered, to the lens plane 16a of the microlens 11a, with the resin member 17a providing firm coupling of them.

Moreover, though the resin member 17a covers the lens plane 16a of the microlens 11a, since the resin member 17a has a refractive index different from that of the microlens 11a, no loss of optical functions of the microlens 11a occurs from the resin member 17a. Thus, by taking into consideration the difference in refractive indexes between the resin member 17a and air at the a designing stage, it is possible to provide desired optical characteristics to the microlens 11a.

The resin member 17b placed between the microlenses 11a and 11b has a refractive index different from that of the microlenses 11a and 11b and, as in the case of the resin member 17a, operates to fill in the space between non-lens planes 16b and 16b' facing each other and serves to couple both of them. Therefore, the clearance portion between the microlenses 11a and 11b is protected from dust, humidity or the like, and the non-lens plane 16b of the microlens 11a is mechanically coupled, to the non-lens plane 16b' of the microlens 11b, with the resin member 17b providing firm connection between them.

Though the resin member 17b existing between the microlenses 11a and 11b covers the non-lens planes 16b and 16b' of the microlenses 11a and 11b, since the resin member 17b has a refractive index different from that of the microlenses 11a and 11b, optical characteristics of the microlenses 11a and 11b are not affected by the resin member 17b.

The resin member 17c which is placed between the microlens 11b and the optical fiber 14 serving as the optical waveguide fills in a space between the lens plane 16a' of the microlens 11b and the end face 14a of the optical fiber 14 receiving signal light from the lens plane 16a', and couples the lens plane 16a' to the end face 14a.

Therefore, since the clearance between the microlens 11b and the optical fiber 14 is sealed with the resin member 17c, the sealed clearance portion is protected from dust, humidity or the like, and the lens plane 16a' of the microlens 11b is mechanically coupled, to the end face 14a of the optical fiber 14, with the resin member 17c providing firm connection between them.

Moreover, the resin member 17c, as in the case of the resin member 17a used to cover the lens plane 16a of the microlens 11a, has a refractive index different from that of the microlens 11b, and no loss of the optical characteristics of the microlens 11b occurs from the resin member 17c. Thus, by taking into consideration the difference in refractive indexes between the resin member 17c and air at a the designing stage of the lens plane 16a' of the microlens 11b, it is possible to provide desired optical characteristics to the microlens 11b.

In the optical lens device assembly 10 according to the embodiment of the present invention, the resin members 17a and 17c placed between the microlens 11a or 11b and the optical device such as the laser diode 13 or the optical fiber 14 operates to seal the clearance between them and to couple them mechanically, without causing the loss of optical characteristics of the microlense 11a and 11b.

Moreover, the clearance between the microlenses 11a and 11b is sealed with the resin member 17b and the two microlenses are mechanically coupled.

Therefore, since sealing of an optical system including microlenses by a comparatively simplified configurations and reliable fixing of fine microlenses to a specified position are made possible without the use of a complicated sealing mechanism such as a housing for sealing, it is possible to improve the durability of the optical lens device assembly 10.

Further, in the optical lens device assembly 10 of the above embodiments, a light emitting element was used. Taking the place of it, a light receiving element such as a photo-diode and the like can be used to construct the optical lens device assembly. In this case, the light guided by optical fiber 14 is emitted from an end face of the optical fiber 14, then enters the light receiving element via two microlenses 11b and 11a.

It is apparent that the present invention is not limited to the above embodiments but may be changed and modified without departing from the scope and spirit of the invention. For example, in the embodiment, an example in which the optical lens device assembly comprising the two microlenses is described. However, the present invention may also have a form, in which a microlens as a first optical device is coupled to a second optical device, and the second optical device may be an optical waveguide such as an optical fiber, a light emitting element such as the laser diode, or a light receiving element such as photo-diode. Also the first optical device may be of other lens types, for example, a refractive lens such as a ball lens and the like.

Moreover, the resin material used in the embodiment is not limited to the silicone resin. Any resin material having a refractive index different from that of the optical element making up the lens device can be selected for use, depending on the material for the optical lens device.

What is claimed is:

1. An optical lens device assembly comprising:

a substrate having a groove;

two optical lens devices placed face to face mutually in said groove;

an optical fiber placed in said groove and facing one of said optical lens devices;

an optical device placed on said substrate and facing the other of said optical lens devices, and having either a light emitting function or light receiving function; and a resin member having optical transmittance used to fill in spaces of between said optical device and said one of optical lens devices, between said optical lens devices and between the other of said optical lens devices and said optical fiber;

wherein said resin member is made of a resin material having a refractive index different from that of each of said optical lens devices, and the optical axis of each of said optical lens devices coincides with those of said optical fiber and said optical device.

2. The optical lens device assembly according to claim 1, wherein said optical lens devices are microlenses which are made of a silicon crystal substrate and each has a lens plane on one of end faces, and said lens plane of one of said microlenses faces to said optical fiber, and said lens plane of the other of said microlenses faces to said optical device.

3. The optical lens device assembly according to claim 1, wherein said resin member comprises silicone resin.

4. The optical lens device assembly according to claim 1, wherein each of said optical lens devices is designed so that its optical characteristics are acquired based on a refractive index of said resin material.

5. The optical lens device assembly according to claim 1, wherein each of said optical lens devices is a microlens having at least a lens plane of diffractive type.

6. The optical lens device assembly according to claim 1, wherein said groove is a V-shaped concave groove.

7. An optical lens device assembly comprising:

a substrate having a groove;

an optical lens device placed in said groove;

an optical fiber placed in said groove and facing one end of said optical lens device;

an optical device placed on said substrate and facing an other end of said optical lens device, and having either a light emitting function or light receiving function; and a resin member having optical transmittance used to fill in spaces between said optical device and said optical lens device and between said optical lens device and said optical fiber;

wherein said resin member is made of a resin material having a refractive index different from that of said optical lens device, and the optical axis of said optical lens device coincides with those of said optical fiber and said optical device.

8. The optical lens device assembly according to claim 7, wherein said optical lens device is a microlens which is made of a silicon crystal substrate and has at least one lens plane.

9. The optical lens device assembly according to claim 7, wherein said resin member comprises silicone resin.

10. The optical lens device assembly according to claim 7, wherein said optical lens device is designed so that its optical characteristics are acquired based on a refractive index of said resin material.

11. The optical lens device assembly according to claim 7, wherein said optical lens device is a microlens having at least a lens plane of diffractive type.

12. The optical lens device assembly according to claim 7, wherein said groove is a V-shaped concave groove.

* * * * *